(12) United States Patent
Beckwith et al.

(10) Patent No.: US 10,338,893 B2
(45) Date of Patent: *Jul. 2, 2019

(54) MULTI-STEP AUTO-COMPLETION MODEL FOR SOFTWARE DEVELOPMENT ENVIRONMENTS

(71) Applicant: Microsoft Technology Licensing, LLC, Redmond, WA (US)

(72) Inventors: Justin Beckwith, Bellevue, WA (US); Thao Doan, Redmond, WA (US); Vishal R. Joshi, Redmond, WA (US); Alison Q. Lu, Redmond, WA (US); Wai Man Yuen, Bellevue, WA (US); Mikhail Arkhipov, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,595

(22) Filed: Jan. 11, 2016

(65) Prior Publication Data

US 2016/0124720 A1 May 5, 2016

Related U.S. Application Data

(63) Continuation of application No. 13/909,640, filed on Jun. 4, 2013, now Pat. No. 9,244,658.

(51) Int. Cl.
*G06F 17/27* (2006.01)
*G06F 9/44* (2018.01)
(Continued)

(52) U.S. Cl.
CPC ............. *G06F 8/33* (2013.01); *G06F 3/0482* (2013.01); *G06F 3/04842* (2013.01); *G06F 8/20* (2013.01);
(Continued)

(58) Field of Classification Search
CPC ............. G06F 17/24; G06F 17/30914; G06F 17/2247; G06F 8/33; G06F 8/20;
(Continued)

(56) References Cited

U.S. PATENT DOCUMENTS 5,187,788 A * 2/1993 Marmelstein ............. G06F 8/34
717/109
6,256,028 B1 * 7/2001 Sanford ............ G06F 17/30902
707/E17.12
(Continued)

OTHER PUBLICATIONS

Sangmok Han et al., Code Completion from Abbreviated Input, 2009 IEEE/ACM International, [Retrieved on Oct. 21, 2017]. Retrieved from the internet: <URL: http://ieeexplore.ieee.org/stamp/stamp.jsp?arnumber=5431761> 12 Pages (332-343).*
(Continued)

*Primary Examiner* — Anibal Rivera
(74) *Attorney, Agent, or Firm* — Fiala & Weaver P.L.L.C.

(57) ABSTRACT

Systems and methods for providing auto-completion functionality in a source code editor are described. In accordance with the systems and methods, code entities that are candidates for auto-completion are presented to a user via multiple auto-completion menus that are accessed in steps rather than via a single auto-completion menu. The multiple auto-completion menus include at least a first menu and a second menu. The first menu includes a common portion (e.g., a common prefix) of a subset of the candidate code entities. The second menu includes the subset of the candidate code entities and is presented when the user selects the common portion from the first menu.

20 Claims, 6 Drawing Sheets

(51) Int. Cl.
G06F 17/30 (2006.01)
G06F 8/33 (2018.01)
G06F 3/0482 (2013.01)
G06F 3/0484 (2013.01)
G06F 8/34 (2018.01)
G06F 8/20 (2018.01)
G06F 8/30 (2018.01)
G06F 11/36 (2006.01)

(52) U.S. Cl.
CPC ............... *G06F 8/315* (2013.01); *G06F 8/34* (2013.01); *G06F 11/3612* (2013.01)

(58) Field of Classification Search
CPC ... G06F 8/437; G06F 8/24; G06F 8/73; G06F 11/36; G06F 9/4446; G06F 11/3612; G06F 17/276; G06F 17/30902; G06F 17/3064; G06F 17/3097; G06F 8/34; G06F 8/315
See application file for complete search history.

(56) References Cited

U.S. PATENT DOCUMENTS

| | | | | |
|---|---|---|---|---|
| 6,314,559 | B1* | 11/2001 | Sollich | G06F 8/33 717/111 |
| 6,564,213 | B1* | 5/2003 | Ortega | G06F 17/3064 |
| 7,296,264 | B2* | 11/2007 | Zatloukal | G06F 8/33 717/116 |
| 7,720,209 | B2 | 5/2010 | Ovsyannikov et al. | |
| 7,735,066 | B1* | 6/2010 | Myers | G06F 11/3612 717/125 |
| 8,321,836 | B2 | 11/2012 | Meijer et al. | |
| 8,375,356 | B2 | 2/2013 | Rathbone et al. | |
| 8,601,019 | B1* | 12/2013 | Weininger | G06F 17/3097 707/769 |
| 8,645,825 | B1* | 2/2014 | Cornea | G06F 17/3064 715/257 |
| 8,732,660 | B2 | 5/2014 | Neill et al. | |
| 2002/0054161 | A1* | 5/2002 | Durham | G06F 17/30902 715/841 |
| 2002/0095657 | A1* | 7/2002 | Vaidyanathan | G06F 9/453 717/110 |
| 2004/0153995 | A1* | 8/2004 | Polonovski | G06F 8/20 717/113 |
| 2005/0125767 | A1* | 6/2005 | Hawley | G06F 8/33 717/100 |
| 2006/0026559 | A1* | 2/2006 | Gunturi | G06F 8/20 717/110 |
| 2006/0224553 | A1* | 10/2006 | Chtcherbatchenko | G06F 17/2247 |
| 2007/0038978 | A1* | 2/2007 | Meijer | G06F 8/437 717/106 |
| 2007/0050728 | A1* | 3/2007 | Vayssiere | G06F 17/276 715/780 |
| 2008/0002817 | A1* | 1/2008 | Ovsyannikov | G06F 8/24 379/200 |
| 2008/0134142 | A1* | 6/2008 | Nathan | G06F 8/33 717/114 |
| 2008/0235677 | A1* | 9/2008 | Aniszczyk | G06F 8/33 717/165 |
| 2008/0270981 | A1* | 10/2008 | Hutchison | G06F 8/33 717/110 |
| 2009/0313597 | A1* | 12/2009 | Rathbone | G06F 8/33 717/100 |
| 2010/0050154 | A1* | 2/2010 | Balasubramanian | G06F 8/33 717/113 |
| 2010/0235730 | A1* | 9/2010 | Campbell | G06F 17/24 715/256 |
| 2010/0269095 | A1 | 10/2010 | King et al. | |
| 2011/0167404 | A1* | 7/2011 | Liu | G06F 8/33 717/106 |
| 2012/0110560 | A1* | 5/2012 | Fisher | G06F 8/20 717/146 |
| 2012/0131547 | A1* | 5/2012 | Muir | G06F 8/20 717/109 |
| 2012/0174061 | A1* | 7/2012 | McCollum | G06F 8/33 717/106 |
| 2012/0198419 | A1 | 8/2012 | Neill et al. | |
| 2013/0263086 | A1 | 10/2013 | Carter et al. | |
| 2014/0109043 | A1* | 4/2014 | Bolotnikoff | G06F 17/30914 717/113 |
| 2014/0173563 | A1 | 6/2014 | Dias et al. | |
| 2014/0195519 | A1* | 7/2014 | Holt | G06F 17/3064 707/722 |
| 2014/0207789 | A1* | 7/2014 | Lee | G06F 17/3087 707/741 |
| 2016/0188301 | A1* | 6/2016 | Zang | G06F 8/33 717/113 |

OTHER PUBLICATIONS kyle I. Murray et al., Beyond Autocomplete: Automatic Function Definition, 2011, [Retrieved on Feb. 12, 2019]. Retrieved from the internet: <URL: https://ieeexplore.ieee.org/stamp/stamp.jsp?tp=&arnumber=6070421> 2 Pages (259-260) (Year: 2011).*

Jens Lincke et al., Scoping Changes in Self-supporting Development Environments using Context-oriented Programming, Jun. 11, 2012, [Retrieved on Feb. 12, 2019]. Retrieved from the internet: <URL: http://delivery.acm.org/10.1145/2310000/2307438/a2-lincke.pdf?> 6 Pages (1-6) (Year: 2012).*

"DIY Intellisense", Retrieved From <<http://www.codeproject.com/Articles/5839/DIY-Intellisense>>, Jan. 12, 2004, 5 Pages.

"Filter IntelliSense Service", Retrieved From <<https://technet.microsoft.com/en-us/library/jj915366.aspx>>, Apr. 16, 2013, 4 Pages.

"HTML5 New Form Attributes", Retrieved From <<https://web.archive.org/web/20120924023953/http://www.w3schools.com/Html/html5_form_attributes.asp>>, Sep. 24, 2012, 6 Pages.

"JavaScript IntelliSense", Retrieved From <<https://msdn.microsoft.com/en-us/library/bb385682.aspx>>, Retrieved On: Apr. 16, 2013, 11 Pages.

"Final Office Action Issued in U.S. Appl. No. 13/909,640", dated Jul. 6, 2015, 15 Pages.

"Non Final Office Action Issued in U.S. Appl. No. 13/909,640", dated Feb. 11, 2015, 14 Pages.

"Notice of Allowance Issued in U.S. Appl. No. 13/909,640", dated Sep. 17, 2015, 9 Pages.

Gonzalez, Scott, "Extensible Autocomplete", Retrieved From <<https://blog.jqueryui.com/2010/08/extensible-autocomplete/>>, Aug. 24, 2010, 4 Pages.

* cited by examiner

MULTI-STEP AUTO-COMPLETION MODEL FOR SOFTWARE DEVELOPMENT ENVIRONMENTS

CROSS-REFERENCE TO RELATED APPLICATIONS

This application is a continuation of U.S. patent application Ser. No. 13/909,640, filed Jun. 4, 2013, the entirety of which is incorporated by reference herein.

BACKGROUND

Software development environments exist that aid software developers in writing program code. A software development environment may include a source code editor for entering source code, one or more build automation tools, and a code debugger. Examples of commercially-available software development environments include Microsoft® WebMatrix® and Microsoft® Visual Studio®, provided by Microsoft Corporation of Redmond, Wash., JDeveloper® and NetBeans®, provided by Oracle Corporation of Redwood City, Calif., Adobe® Dreamweaver®, provided by Adobe Systems Inc. of San Jose, Calif., Eclipse IDE provided by Eclipse Foundation of Ontario, Canada, ActiveState® Komodo® provided by ActiveState Software Inc. of Vancouver, British Columbia, and IntelliJ® IDEA, provided by JetBrains, s.r.o., of Prague, Czech Republic.

Some conventional software development environments provide assistance to developers writing code by presenting lists of possible code "completions" and documentation for those completions, based on one or more characters (e.g., letters, symbols, or a combination thereof) that a user has typed into a source code file. The presentation of automatically-determined code completions is referred to herein as "auto-completion." In Microsoft® WebMatrix® and Microsoft® Visual Studio®, auto-completion is implemented by functionality referred to as IntelliSense®. IntelliSense® represents one of the most important advancements in developer productivity over the past 15 years. Scoped, valid code completion suggestions improve program quality before the program is ever executed, and, at a minimum, increase typing productivity.

In accordance with certain conventional auto-completion implementations, the performance of auto-completion involves analyzing one or more characters that a programmer has input into a source code editor to identify a set of code entities that are candidates for auto-completion. All candidate code entities are presented to the programmer simultaneously within a single drop-down menu. If the programmer selects one of the code entities in the menu, then the input of the selected code entity into the source code editor is completed automatically. This approach to auto-completion can be problematic if there are a large number of candidate code entities, as it may be difficult for the programmer to find a particular code entity of interest from among the long list of code entities.

By way of example, Hypertext Markup Language 5 (HTML 5) provides programmers with the ability to embed custom data attributes on all HTML elements. According to the HTML 5 Specification, such custom data attributes must have an attribute name that is prefixed with "data-". It is thus possible that a single HTML document many include a very large number of "data-" attributes. In accordance with a conventional auto-completion implementation, when a programmer enters "d" into an HTML editor, a single drop-down menu of candidate code entities may be presented that includes every "data-" attribute within the document. If the HTML document includes a very large number of "data-" attributes, this list may be so long that it may be difficult for the programmer to find a particular code entity of interest from among the long list of code entities. There are other constructs within HTML5, such as Accessible Rich Internet Applications (ARIA) attributes that are prefixed with "aria-", which may give rise to the same issue.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

A method for providing auto-completion functionality in a source code editor is described herein. In accordance with the method, a plurality of code entities are identified that are candidates for auto-completion based on data that a user has input into the source code editor. The plurality of code entities include a first subset of code entities having a first common set of initial characters. A first list that includes an element that represents the first subset of code entities is then presented via a user interface of the source code editor. Subsequently, a determination is made that the user has selected from the first list the element that represents the first subset of code entities. In response to the determination that the user has selected from the first list the element that represents the first subset of code entities, a second list that includes at least one code entity in the first subset of code entities is presented via the user interface.

The foregoing method may further include determining that the user has selected a code entity from the second list and automatically completing input of the selected code entity into the source code editor.

In one embodiment of the foregoing method, the element in the first list that represents the first subset of code entities includes the first common set of initial characters.

In another embodiment of the foregoing method, the plurality of code entities includes a plurality of attribute names.

In yet another embodiment of the foregoing method, the first common set of initial characters associated with the first subset of code entities is "data-" and presenting the first list includes presenting a list that includes a "data-" element that represents the first subset of code entities.

In a further embodiment of the foregoing method, the first subset of code entities includes a second subset of code entities having a second common set of initial characters that is longer than and encompasses the first common set of initial characters. In this embodiment, the second list also includes an element that represents the second subset of code entities. In accordance with such an embodiment, the foregoing method may further include determining that the user has selected from the second list the element that represents the second subset of code entities and, in response to determining that the user has selected from the second list the element that represents the second subset of code entities, presenting via the user interface a third list that includes at least one code entity in the second subset of code entities.

The foregoing method may further include generating a record of the plurality of code entities by performing at least one of parsing code input into the source code editor by the user and processing a document that includes one or more code entities associated with a coding framework.

A system is also described herein that includes one or more processors and a storage medium. The storage medium stores computer program logic that is executable by the one or more processors. The computer program logic includes a source code editor and auto-completion logic. The source code editor is programmed to cause the one or more processors to provide a user interface that enables a user to enter source code into a document. The auto-completion logic is programmed to cause the one or more processors to identify a plurality of code entities that are candidates for auto-completion based on data that the user has input into the source code editor and to present the plurality of code entities to the user via a plurality of auto-completion menus. The plurality of auto-completion menus include at least a first menu that includes a common portion of a subset of the plurality of code entities and a second menu that includes the subset of the plurality of code entities and is presented when the user selects the first common portion from the first menu.

In one embodiment of the foregoing system, the number of menus in the plurality of auto-completion menus is determined by the auto-completion logic based upon one or more of a number of code entities in the plurality of code entities and a structure of the code entities in the plurality of code entities.

In another embodiment of the foregoing system, the number of menus in the plurality of auto-completion menus is selectable by a user of the system.

In yet another embodiment of the foregoing system, the auto-completion logic is programmed to cause the one or more processors to present each menu in the plurality of auto-completion menus to the user via a separate user interface window.

In a further embodiment of the foregoing system, the auto-completion logic is further programmed to cause the one or more processors to determine that the user has selected a code entity from the one of the plurality of auto-completion menus and, in response to the determination that the user has selected the code entity from the one of the plurality of auto-completion menus, to automatically complete entry of the selected code entity into the source code editor.

In a still further embodiment of the foregoing system, the plurality of code entities include a plurality of attribute names.

In another embodiment of the foregoing system, the common portion of the subset of the plurality of code entities is "data-".

In yet another embodiment of the foregoing system, the computer program logic further includes a parser that is programmed to cause the one or more processors to parse source code entered into the source code editor to generate a record of one or more code entities in the plurality of code entities.

In a further embodiment of the foregoing system, the computer program logic further includes a document processor that is programmed to cause the one or more processors to process a document that includes code entities associated with a coding framework to generate a record of one or more code entities in the plurality of code entities.

The document may be, for example, an XML schema document that includes the code entities associated with the coding framework.

A computer program product is also described herein. The computer program product comprises a computer readable storage device having computer program logic recorded thereon for enabling a processing unit to provide auto-completion functionality in a source code editor. The computer program logic includes first computer program logic, second computer program logic, third computer program logic and fourth computer program logic. When executed by the processing unit, the first computer program logic identifies a plurality of code entities that are candidates for auto-completion based on data that a user has input into the source code editor. The plurality of code entities includes a first subset of code entities having a first common set of initial characters. When executed by the processing unit, the second computer program logic presents via a user interface of the source code editor a first list that includes an element that represents the first subset of code entities. When executed by the processing unit, the third computer program logic determines that the user has selected from the first list the element that represents the first subset of code entities. When executed by the processing unit, the fourth computer program logic presents via the user interface a second list that includes at least one code entity in the first subset of code entities in response to the determination that the user has selected from the first list the element that represents the first subset of code entities.

In one embodiment of the foregoing computer program product, the computer program logic also includes fifth computer program logic and sixth computer program logic. When executed by the processing unit, the fifth computer program logic determines that the user has selected a code entity from the second list. When executed by the processing unit, the sixth computer program logic automatically completes input of the selected code entity into the source code editor.

In another embodiment of the foregoing computer program product, the element in the first list that represents the first subset of code entities comprises the first common set of initial characters.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
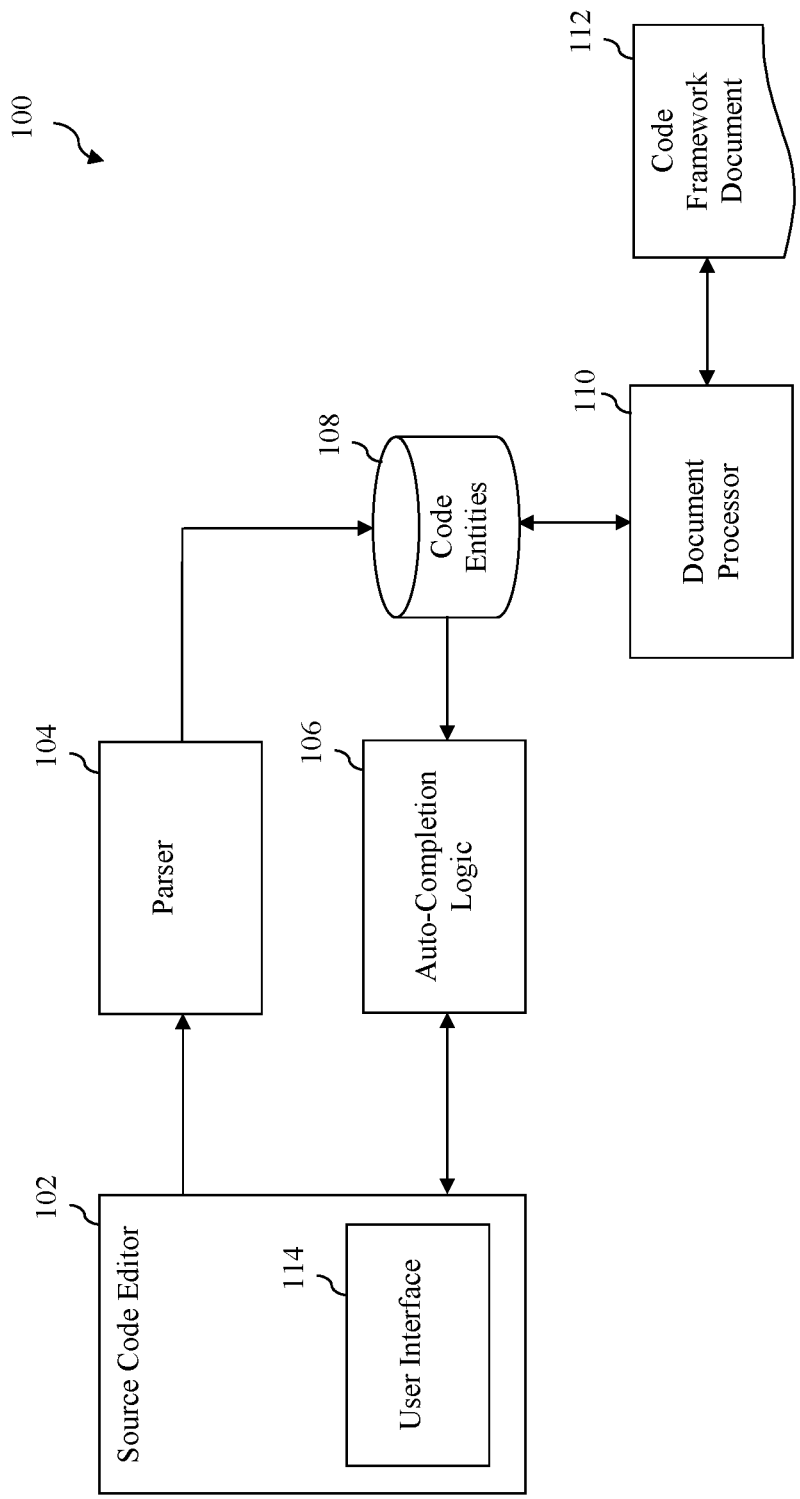
FIG. 1 is a block diagram of an example system that provides auto-completion functionality to a source code editor in accordance with a multi-step auto-completion model.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein are directed to systems and methods for providing auto-completion functionality in a source code editor. As discussed in the Background Section above, in some conventional auto-completion implementations, the performance of auto-completion involves analyzing one or more characters that a programmer has input into a source code editor to identify a set of code entities that are candidates for auto-completion. All candidate code entities are presented to the programmer simultaneously within a single drop-down menu. If the programmer selects one of the code entities in the menu, then the input of the selected code entity into the source code editor is completed automatically. This approach to auto-completion can be problematic if there are a large number of candidate code entities, as it may be difficult for the programmer to find the particular code entity in which he/she is interested from among the long list of code entities.

In accordance with certain embodiments described herein, the foregoing problems are addressed and overcome by presenting candidate code entities to the programmer via multiple auto-completion menus that are accessed in steps rather than via a single auto-completion menu. The multiple auto-completion menus include at least a first menu and a second menu. The first menu includes a common portion (e.g., a common prefix) of a subset of the candidate code entities. The second menu includes the subset of the candidate code entities and is presented when the user selects the common portion from the first menu. For example, when the programmer is editing an HTML document coded using HTML 5, there may be a large number of code entities (e.g. attribute names) in the document that begin with the common prefix "data-". In further accordance with this example, when a programmer inputs "d" into a source code editor, a first menu is presented to the programmer that includes the common prefix "data-" as well as a number of code entities that start with the letter "d" but do not begin with "data-". When the programmer selects the common prefix "data-" from the first menu, a second menu is presented that includes all the code entities that begin with "data-". When the programmer selects a code entity from either the first menu or the second menu, the entry of the selected code entity into the source code editor is automatically carried out. A similar approach can be used to present other HTML5 attribute types that share a common prefix, such as Accessible Rich Internet Applications (ARIA) attributes that are prefixed with "aria-".

As will be discussed herein, the number of auto-completion menus used to present the candidate code entities to the programmer is not limited to two, and could also include a number greater than two. Except for the first menu presented, every other menu is accessed by selecting a common prefix (or other portion of a code entity) in a previously-presented menu. Depending upon the implementation, the number of menus may be fixed by design, determined dynamically based on the size of the set of candidate code entities and/or the structure of such code entities, or selected by a user of the source code editor via a suitable user interface.

As will also be discussed herein, by presenting the candidate code entities to the programmer via multiple menus, with certain menus being presented only when the programmer selects a common portion of a subset of candidate code entities from a previously-presented menu, embodiments described herein make it easy for a programmer to find and select a code entity for auto-completion even when the number of candidate code entities is very large.

Section II, below, describes an example system that provides auto-completion functionality to a source code editor in accordance with the above-described multi-step auto-completion model. Section III below, describes an example method for providing auto-completion functionality to a source code editor in accordance with the above-described multi-step auto-completion model. Section IV describes an example processor-based computer system that may be used to implement certain features described herein. Section V provides some concluding remarks.

II. Example System that Implements Multi-Step Auto-Completion Model

FIG. 1 is a block diagram of an example system 100 that provides auto-completion functionality to a source code editor in accordance with a multi-step auto-completion model. It is noted that system 100 is described herein by way of example only. Persons skilled in the relevant art(s) will readily appreciate that the multi-step auto-completion techniques described herein may be implemented in a wide variety of systems other than system 100 of FIG. 1.

As shown in FIG. 1, system 100 includes a source code editor 102, a parser 104, auto-completion logic 106 and a document processor 110. In one embodiment, each of these components comprises software that is executed by the same processor-based computer system. One example of a processor-based computer system that may be used to execute these components is described in Section IV below. In an alternate embodiment, these components may be distributed across two or more processor-based computer systems. In accordance with such an alternate embodiment, information may be shared between the different components using suitable interconnections or communication links as would be understood by persons skilled in the relevant art(s).

Source code editor 102 comprises a text editor that enables a user thereof to at least create and edit the source code of a computer program. To achieve this, source code editor includes a user interface 114. User interface 114 operates to accept text that is input by a user into a source code document and to display such document and text so that it may be viewed by the user. As will be discussed herein, source code editor 402 includes auto-completion functionality to simplify and/or speed up the creation/editing of source code. Source code editor 102 may also include other features designed to simplify and/or speed up the creation/editing of source code, such as syntax checking, syntax highlighting, and bracket matching functionality.

Parser 104 is a component that operates to analyze the text of a document currently being edited by source code editor 102 to identify code entities included therein. Parser 104 also operates to maintain a data structure that includes a representation of code entities that currently exist in the document. Code entities identified by parser 104 are stored in memory, and are shown in FIG. 1 as code entities 108. As used herein, the term "code entity" is intended to broadly refer to any discrete segment of source code that has meaning within a particular programming language. By way of example, and without limitation, a code entity may comprise an attribute name or an attribute value.

Document processor 110 is a component that operates to read a code framework document 112 and extract therefrom one or more code entities which are also stored in memory as part of code entities 108. Code framework document 112 provides information about a code framework. Generally speaking, a code framework comprises one or more code libraries that are published to aid developers in coding certain types of applications. One example of a code framework is jQuery® Mobile, provided by jQuery Foundation, Inc. jQuery® mobile is a multi-browser JavaScript library designed to simplify the client-side scripting of HTML.

By extracting code entities from code framework document 112, document processor 110 enables auto-completion logic 106 to obtain candidate code entities for auto-completion from a source other than the document that is currently being edited by source code editor 102. In this case, the auto-completion candidates represent code entities used in code framework libraries, which can be extremely useful to a programmer.

In one embodiment, code framework document 112 comprises an XML schema document that is formatted in a manner that document processor 110 can understand. Although document processor 110 is shown processing only a single code framework document 112 in FIG. 1, it is to be understood that document processor 110 can process any number of code framework documents to which it has access. Such code framework documents may be stored locally with respect to a computer system on which document processor 110 is executing or may be stored remotely with respect to a computer system on which document processor 110 is executing and accessed via a suitable communication link.

Code entities 108 comprise a record of various code entities that may be generated at least in part by parser 104 and document processor 110. As noted above, parser 104 generates a record of such code entities by parsing code input into source code editor 102 by a user thereof and document processor 110 generates a record of such code entities by processing a code framework document, such as code framework document 112, that includes one or more code entities associated with a coding framework.

Auto-completion logic 106 operates to provide auto-completion functionality to source code editor 102. In particular, auto-completion logic 106 analyzes one or more characters input into source code editor 102 by a user to identify a set of code entities from among code entities 108 that are candidates for auto-completion. Auto-completion logic 106 then presents the set of candidate code entities to the user via a plurality of auto-completion menus. The plurality of auto-completion menus includes at least a first menu and a second menu. The first menu includes at least a common portion of a subset of the set of candidate code entities. The second menu includes the subset of the set of candidate code entities and is presented when the user selects the common portion from the first menu.

Figure 2:
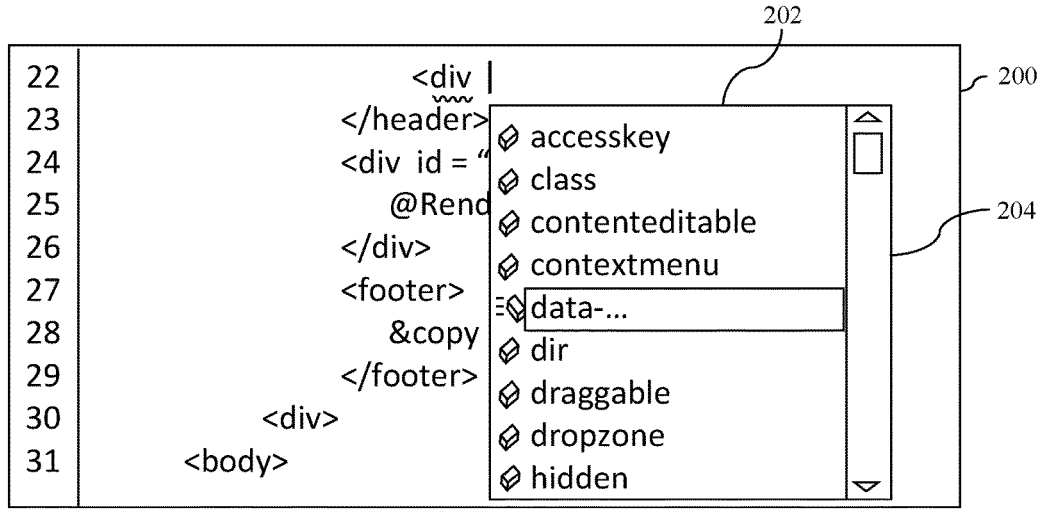
FIG. 2 depicts a portion of a graphical user interface (GUI) in which a first auto-completion menu in a plurality of auto-completion menus is presented to a user of a source code editor in accordance with a multi-step auto-completion model.

Various examples of the operation of auto-completion logic 106 will now be discussed in reference to FIGS. 2-6. In particular, FIG. 2 depicts a portion 200 of a graphical user interface (GUI) of source code editor 102 in which is displayed source code being edited by a user thereof. As further shown in FIG. 2, the user has just typed "<div" into source code editor 102. In response to detecting this sequence of characters, auto-completion logic 106 identifies a plurality of code entities within code entities 108 that are candidates for auto-completion. A subset of this plurality of code entities includes the common prefix "data-".

Auto-completion logic 106 then causes a first menu 202 to be presented to the user of source code editor 102. First menu 202 includes a number of code entities that are candidates for auto-completion such as "accesskey", "class", "contenteditable", "contextmenu", "dir", "draggable", "dropzone", and "hidden". Other candidate code entities within first menu 202 may be accessed by using a scroll bar 204. First menu 202 also includes an entry "data-", which is the common prefix of all the "data-" attribute names included within the set of candidate code entities. The user may select any of the candidate code entities within first menu 202. This will cause the selected code entity to be automatically input into source code editor 102. For example, if the user selects the code entity "accesskey", then "accesskey" will be automatically inserted at the position of the cursor, immediately after the characters "<div" on line 22.

Figure 3:
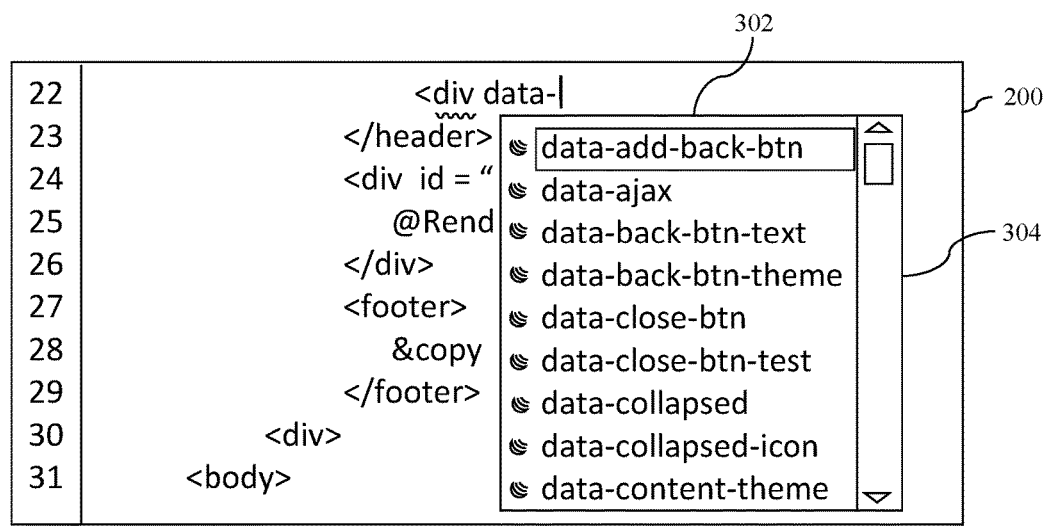
FIG. 3 depicts a portion of a GUI in which a second auto-completion menu in a plurality of auto-completion menus is presented to a user of a source code editor in accordance with a multi-step auto-completion model.

However, if the user selects the "data-" entry from first menu 202, then auto-completion logic 106 will automatically insert the prefix "data-" at the current position of the cursor and cause a second menu 302 to be presented to the user of source code editor 102, as shown in FIG. 3. Second menu 302 is presented in a different user interface window than that used to present first menu 202. Second menu 302 includes all the candidate code entities that include the prefix "data-". For example, second menu 302 includes the code entities "data-add-back-btn", "data-ajax", "data-back-btn-text", "data-back-btn-theme", "data-close-btn", "data-closebtn-test", "data-collapsed", "data-collapsed-icon" and "data-content-theme". Other candidate code entities beginning with "data-" may be accessed from within second menu 302 by using a scroll bar 304. The user may select any of the candidate code entities within second menu 302. This will cause the entry of the selected code entity to be automatically completed in source code editor 102. For example, if the user selects the code entity "data-add-back-btn", input of the selected code entity into source code editor 102 will be completed automatically, such that "data-add-back-btn" will follow the characters "<div" on line 22.

Figure 4:
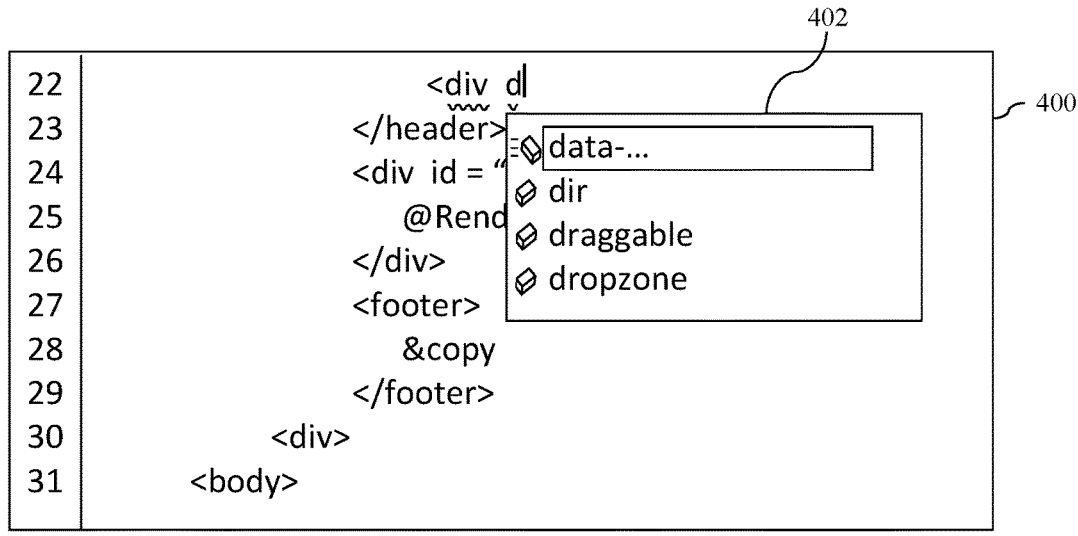
FIG. 4 depicts a portion of a GUI in which a first auto-completion menu in a plurality of auto-completion menus is presented to a user of a source code editor in accordance with a multi-step auto-completion model.

FIG. 4 depicts another example of the multi-step auto completion functionality. In particular, FIG. 4 depicts a portion 400 of a GUI of source code editor 102 in which is displayed source code being edited by a user thereof. As further shown in FIG. 4, the user has just typed "d" into source code editor 102. In response to detecting this character, auto-completion logic 106 identifies a plurality of code entities within code entities 108 that are candidates for auto-completion. A subset of this plurality of code entities includes the common prefix "data-".

Auto-completion logic 106 then causes a first menu 402 to be presented to the user of source code editor 102. First menu 402 includes a number of code entities that are candidates for auto-completion such as "dir", "draggable", and "dropzone". First menu 402 also includes an entry "data-", which is the common prefix of all the "data-" attribute names included within the set of candidate code entities. The user may select any of the candidate code entities within first menu 402. This will cause input of the selected code entity into source code editor 102 to be completed automatically. For example, if the user selects the code entity "dir", input of the selected code entity into source code editor 102 will be completed automatically, such that "dir" will follow the characters "<div" on line 22.

However, if the user selects the "data-" entry from first menu 402, then auto-completion logic 106 will automatically complete the prefix "data-" within source code editor 102 and cause a second menu to be presented to the user of source code editor 102 that includes all the candidate code entities that include the prefix "data-". The user may select any of the candidate code entities from within the second menu, which will cause entry of the selected code entity to be automatically completed in source code editor 102. The user experience would be very similar to that described above in reference to FIG. 3. Thus, a new figure has not been provided to illustrate this scenario.

The foregoing multi-step model for auto-completion advantageously enables a user of source code editor 102 to easily find and select a code entity for auto-completion even when the number of candidate code entities is very large. For example, for an HTML document coded using HTML 5, auto-completion logic 106 may identify a very large number of "data-" attributes as candidates for auto-completion. Such "data-" attributes may be extracted from the HTML document itself by parser 104 and/or from code framework document 112 by document processor 110. If only a single auto-completion menu were used, the list of candidate code entities would be quite large and would likely be dominated by the "data-" attributes. A user of source code editor 102 looking for a code entity that was not a "data-" attribute might nevertheless be required to scroll through all the different "data-d" attributes to find the code entity in which he/she is interested. In contrast, in accordance with the multi-step model described above, the complete set of "data-" attributes is partitioned out into a second auto-completion menu, making the first auto-completion menu much easier to navigate for the user.

Figure 5:
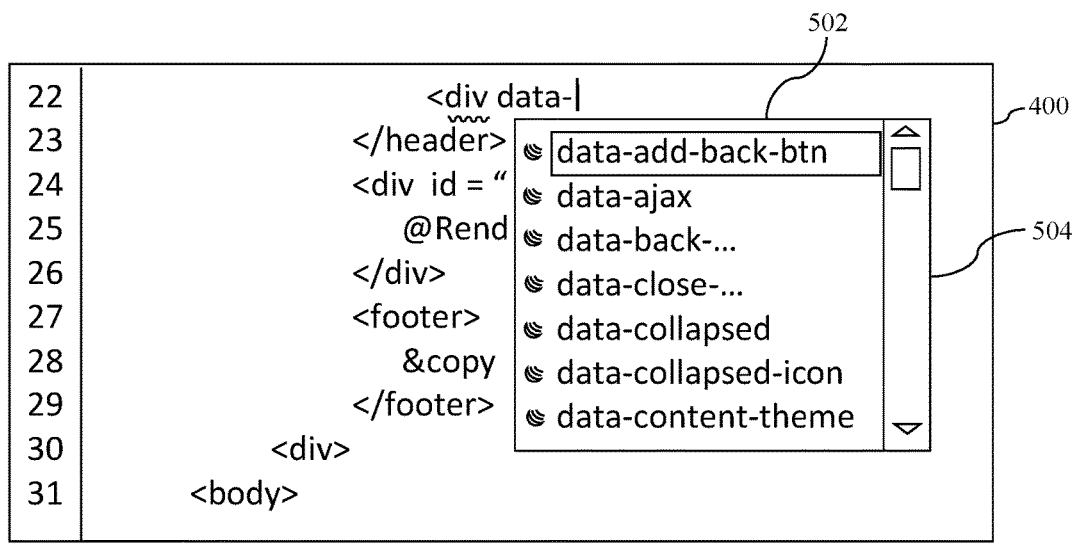
FIG. 5 depicts a portion of a GUI in which a second auto-completion menu in a plurality of auto-completion menus is presented to a user of a source code editor in accordance with a multi-step auto-completion model.

In certain embodiments, auto-completion logic 106 may utilize more than two menus to present code entities that are candidates for auto-completion to a user of source code editor 102. An example of this will now be presented in reference to FIGS. 5 and 6. For the purposes of this example, assume that a user of source code editor 102 has selected the "data-" entry from first menu 402 shown in FIG. 4. In response to this selection, auto-completion logic 106 automatically completes the prefix "data-" within source code editor 102 and presents a second menu 502, as shown in FIG. 5. Second menu 502 includes candidate code entities that begin with the prefix "data-", such as "data-add-back-btn", "data-ajax", "data-collapsed", "data-collapsed-icon", and "data-content-theme". Other candidate code entities beginning with "data-" may be accessed from within second menu 502 by using a scroll bar 504. Second menu 502 also includes as entries the extended prefixes "data-back-" and "data-close-". Extended prefix "data-back-" is a common prefix of multiple attribute names included within the set of candidate code entities. Extended prefix "data-close-" is also a common prefix of multiple attribute names included within the set of candidate code entities. The user may select any of the candidate code entities within second menu 502. This will cause the entry of the selected code entity to be automatically completed in source code editor 102.

Figure 6:
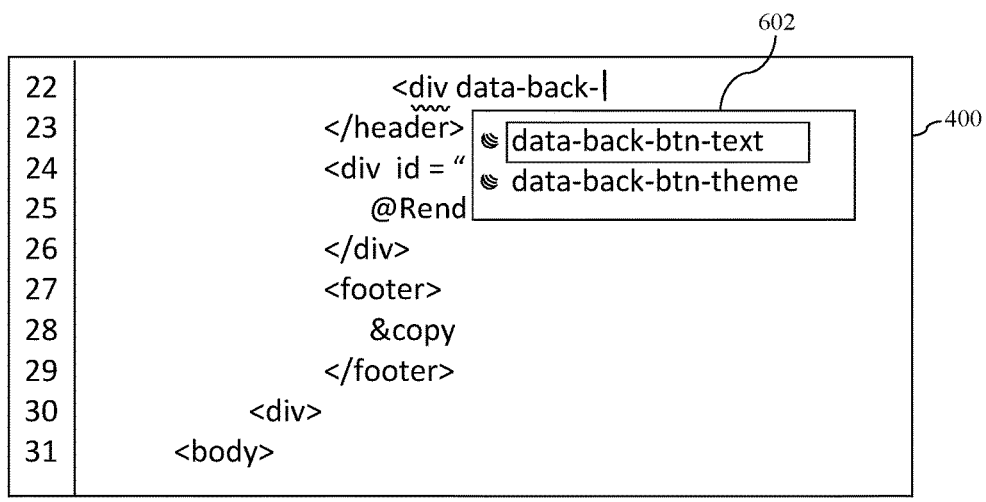
FIG. 6 depicts a portion of a GUI in which a third auto-completion menu in a plurality of auto-completion menus is presented to a user of a source code editor in accordance with a multi-step auto-completion model.

However, if the user selects the "data-back-" entry from second menu 502, then auto-completion logic 106 will automatically extend the prefix "data-" to "data-back-" within source code editor 102 and cause a third menu 602 to be presented to the user of source code editor 102, as shown in FIG. 6. Third menu 602 includes all the candidate code entities that include the prefix "data-back-". For example, third menu 602 includes the code entities "data-back-btn-text" and "data-back-btn-theme". The user may select any of the candidate code entities within third menu 602. This will cause the entry of the selected code entity to be automatically completed in source code editor 102. For example, if the user selects the code entity "data-back-btn-text", input of the selected code entity into source code editor 102 will be completed automatically, such that "data-back-btn-text" will follow the characters "<div" on line 22.

It can be seen from the foregoing example that auto-completion logic 106 may utilize two, three or even more menus to present candidate code entities for auto-completion to a user of source code editor 102. Except for the first menu presented, every other menu may be accessed by selecting a common prefix (or other portion of a code entity) in a previously-presented menu.

In one embodiment, the number of menus used to present candidate code entities is fixed by design. For example, auto-completion logic 106 may be designed to present only certain code entities that have a common prefix and are expected to appear in large numbers in a second or subsequent auto-completion menu. One example of such a code entity is the "data-" attribute in HTML documents coded using HTML 5.

In another embodiment, the number of menus used to present candidate code entities may be determined dynamically by auto-completion logic 106. For example, the number of menus used to present candidate code entities may be determined based on the size of the set of candidate code entities for a particular auto-completion scenario. If the size of the set is large, then auto-completion logic 106 may dynamically add menus for candidate code entities having common prefixes.

As another example, the number of menus used to present candidate code entities may be determined based on the structure of the candidate code entities for a given auto-completion scenario. For example, any code entities having a common prefix that precedes a first marker character or delimiter (e.g., a period or hyphen) may be displayed in a second menu (e.g., all attributes having names with the prefix "data-" may be displayed in a second menu). Within that subset, any code entities having a common prefix that precedes a second marker character or delimiter may be displayed in a third menu (e.g., all attributes having names with the prefix "data-back-" may be displayed in a third mean), and so forth and so on.

In yet another embodiment, the maximum number of menus used to present candidate code entities may be selected by a user of system 100 via user interface 114 or some other suitable configuration means (e.g., a command line script, configuration file or the like). This advantageously enables the user to manage the manner in which candidate code entities for auto-completion are presented by auto-completion logic 106.

III. Example Method for Implementing Multi-Step Auto-Completion Model

Figure 7:
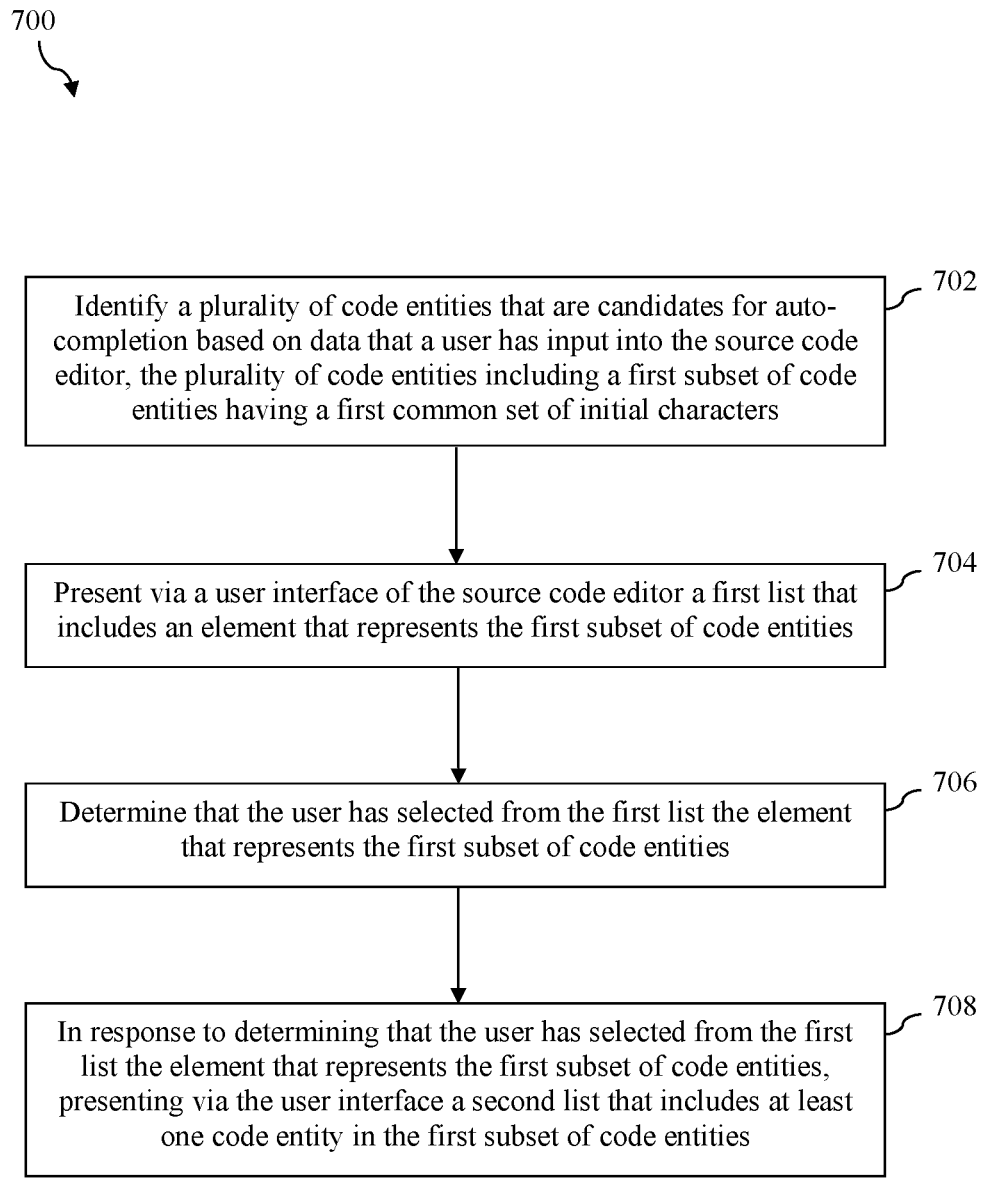
FIG. 7 depicts a flowchart of a method for providing auto-completion functionality in a source code editor in accordance with a multi-step auto-completion model.

FIG. 7 depicts a flowchart 700 of an example method for providing auto-completion functionality in source code editor in accordance with a multi-step auto-completion model. For the sake of illustration, each of the steps of flowchart 700 will be described with continued reference to the components of system 100 as described above in reference to FIG. 1. However, the method is not limited to that embodiment and may be implemented by other components or systems.

As shown in FIG. 7, the method of flowchart 700 begins at step 702, in which auto-completion logic 106 identifies a plurality of code entities that are candidates for auto-completion based on data that a user has input into source code editor 102. The plurality of code entities includes a first subset of code entities having a first common set of initial characters. With reference to the examples presented in FIGS. 2-6, the first subset of code entities having the first common set of initial characters are the attributes having names beginning with "data-".

At step 704, auto-completion logic 106 presents via user interface 114 of source code editor 102 a first list that includes an element that represents the first subset of code entities. With reference to the example presented in FIG. 2, the first list is presented in first menu 202 and the element that represents the first subset of code entities is the entry "data-". With reference to the example presented in FIG. 4, the first list is presented in first menu 402 and the element that represents the first subset of code entities is the entry "data-".

At step 706, auto-completion logic 106 determines that the user has selected from the first list the element that represents the first subset of code entities. With reference to the example presented in FIG. 2, this step comprises auto-completion logic 106 determining that the user has selected the "data-" entry from first menu 202. With reference to the example presented in FIG. 4, this step comprises auto-completion logic 106 determining that the user has selected the "data-" entry from first menu 402.

At step 708, in response to determining that the user has selected from the first list the element that represents the first subset of code entities, auto-completion logic 106 presents via user interface 114 a second list that includes at least one code entity in the first subset of code entities. With reference to the example presented in FIG. 3, the second list is presented in second menu 202 and includes all the attributes having names beginning with "data-" that are eligible for auto-completion. With reference to the example presented in FIG. 5, the second list is presented in second menu 502 and includes attributes having names beginning with "data-" that are eligible for auto-completion.

The foregoing method of flowchart 700 may further include auto-completion logic 106 determining that the user has selected a code entity from the second list and automatically completing input of the selected code entity into source code editor 102. With reference to the example presented in FIG. 3, these steps would entail auto-completion logic 106 determining that the user has selected one of the "data-" attributes from second menu 302 and automatically completing input of the selected code entity into source code editor 102. With reference to the example presented in FIG. 5, these steps would entail auto-completion logic 106 determining that the user has selected one of the "data-d" attributes from second menu 502 and automatically completing input of the selected code entity into source code editor 102.

In one embodiment, the element in the first list that represents the first subset of code entities comprises the first common set of initial characters. Thus, for example, if the first common set of initial characters is "data-", then the element in the first list that represents the first subset of code entities may comprise the characters "data-". However, it is possible that other elements may be used to represent the first subset of code entities in the first list.

In one embodiment, the first subset of code entities described in step 702 includes a second subset of code entities having a second common set of initial characters that is longer than and encompasses the first common set of initial characters. For example, if the first subset of code entities comprises attributes having names with the first common set of initial characters "data-", then the second subset of code entities may comprise attributes having names with the second common set of initial characters "data-back-", which is longer than and encompasses "data-". In accordance with such an embodiment, the second list presented in step 708 may include an element that represents the second subset of code entities. With reference to the example presented in FIG. 5, the element that represents the second subset of code entities is "data-back-".

In further accordance with this embodiment, the method of flowchart 700 may further include auto-completion logic 106 determining that the user has selected from the second list the element that represents the second subset of code entities and, in response to this determination, presenting via user interface 114 a third list that includes at least one code entity in the second subset of code entities. With reference to the example presented above in FIGS. 5 and 6, these steps would entail auto-completion logic 106 determining that the user has selected from second menu 502 the entry "data-back-" and, in response to this determination, presenting third menu 602 that includes the attributes having names beginning with "data-back-" that are eligible for auto-completion.

FIGS. 2-6 have been used to illustrate the presentation of the first list, second list and third list to the user. In FIGS. 2-6, each list is presented by way of a drop-down menu which is rendered in a GUI of source code editor 102. However, it is noted that the first list, second list and third list may be presented to the user via other means as well. For example, the lists may be presented using GUI elements other than drop-down menus. Furthermore, the lists may be presented in a manner that is not visual in nature. For example, a text-to-speech converter or like technology may be used to present the list to a user in auditory manner. However, these are examples only, and still other means for presenting the lists to the user may be implemented.

IV. Example Processor-Based System Implementation

Figure 8:
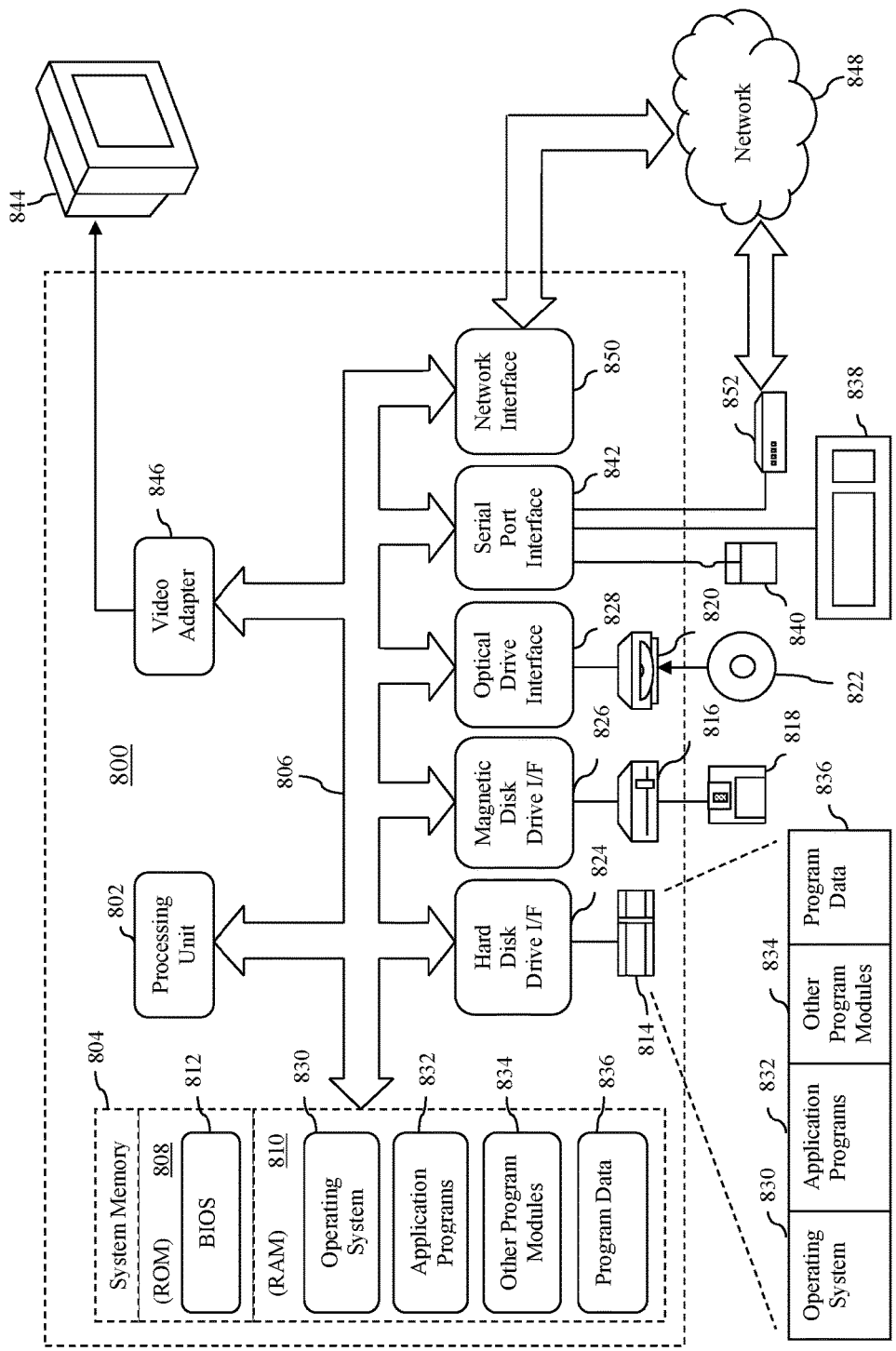
FIG. 8 is a block diagram of an example processor-based computer system that may be used to implement various embodiments.

FIG. 8 depicts an example processor-based computer system 800 that may be used to implement various embodiments described herein. For example, system 800 may be used to execute system 100 as described above in reference to FIG. 1, as well as any components thereof. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more processors or processing cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all of the functions and features of system 100 as described above in reference to FIG. 1, as well as any components thereof. The program modules may also include computer program logic that, when executed by processing unit 802, performs any of the steps or operations shown or described in reference to flowchart 700 of FIG. 7.

A user may enter commands and information into system 800 through input devices such as a keyboard 838 and a pointing device 840. Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB).

A display 844 is also connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface or adapter 850, a modem 852, or other suitable means for establishing communications over the network. Modem 852, which may be internal or external, is connected to bus 806 via serial port interface 842.

As used herein, the terms "computer program medium," "computer-readable medium," and "computer-readable storage medium" are used to generally refer to storage devices or storage structures such as the hard disk associated with hard disk drive 814, removable magnetic disk 818, removable optical disk 822, as well as other storage device or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable computer 800 to implement features of embodiments of the present invention discussed herein. Accordingly, such computer programs represent controllers of the computer 800.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 100 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for providing auto-completion functionality in a source code editor, comprising:
    identifying a plurality of code entities that comprise all candidate code entities available from the source code editor for a single auto-completion operation for a single code entity based on data that a user has input via a user interface (UI) into the source code editor;
    determining, based at least in part upon a total number of code entities in the plurality of code entities, a number of menus in a plurality of auto-completion menus by which to present the plurality of code entities to the user via the UI for the single auto-completion operation, each menu in the plurality of auto-completion menus being configured to present a unique subset of the plurality of code entities at a given time; and
    subsequent to determining the number of menus, presenting a first menu of the plurality of auto-completion menus that allows access to the plurality of code entities in the UI, the first menu including an element that is a code entity representation that when activated by the user via a selection input causes a second menu of the plurality of auto-completion menus to be displayed for the single auto-completion operation, each of the first and second menus including one or more of the candidate code entities for the single auto-completion operation for the single code entity.

2. The method of claim 1, wherein the plurality of code entities includes a plurality of attribute names.

3. The method of claim 1, wherein the presenting comprises at least:
    presenting the first menu to the user wherein the element represents a first subset of the code entities; and
    presenting a second menu to the user that includes at least one code entity in the first subset of the code entities in response to the user selecting the element that represents the first subset of the code entities from the first menu.

4. The method of claim 3, further comprising:
    determining that the user has selected a code entity from the second menu; and
    automatically completing input of the selected code entity into the source code editor.

5. The method of claim 3, wherein the element that represents the first subset of the code entities comprises a first common set of initial characters.

6. The method of claim 5, wherein the first subset of code entities includes a second subset of code entities having a second common set of initial characters that is longer than and encompasses the first common set of initial characters and wherein the second menu further includes an element that represents the second subset of code entities, the method further comprising:
    presenting a third menu to the user that includes at least one code entity in the second subset of code entities in response to the user selecting the element that represents the second subset of the code entities from the second menu.

7. The method of claim 1, further comprising generating a record of the plurality of code entities by performing at least one of:
    parsing code input into the source code editor by the user; and
    processing a document that includes one or more code entities associated with a coding framework.

8. A system, comprising:
    one or more processors; and
    a storage medium that stores computer program logic that is executable by the one or more processors, the computer program logic comprising:
        a source code editor that is programmed to cause the one or more processors to provide a user interface (UI) that enables a user to enter source code into a document; and
        auto-completion logic that is programmed to cause the one or more processors to identify a plurality of code entities that comprise all candidate code entities available from the source code editor for a single auto-completion operation for a single code entity based on data that the user has input into the source code editor via the UI, to determine, based at least in part upon a total number of code entities and a structure of one or more code entities in the plurality of code entities, a number of menus in a plurality of auto-completion menus by which to present the plurality of code entities to the user via the UI for the single auto-completion operation, each menu in the plurality of auto-completion menus being configured to present a unique subset of the plurality of code entities at a given time, and subsequent to determining the number of menus, to present a first menu of the plurality of auto-completion menus that allows access to the plurality of code entities in the UI, the first menu including an element that is a code entity representation that when activated by the user via a selection input causes a second menu of the plurality of auto-completion menus to be displayed for the single auto-completion operation, each of the first and second menus including one or more of the candidate code entities for the single auto-completion operation for the single code entity.

9. The system of claim 8, wherein the element comprises a common portion of a subset of the plurality of code entities, and wherein the plurality of auto-completion menus includes at least a second menu that includes the subset of the plurality of code entities and is presented when the user selects the common portion from the first menu.

10. The system of claim 8, wherein the auto-completion logic is programmed to cause the one or more processors to present each menu in the plurality of auto-completion menus to the user via a separate user interface window.

11. The system of claim 8, wherein the auto-completion logic is further programmed to cause the one or more processors to determine that the user has selected a code entity from one of the plurality of auto-completion menus and, in response to the determination that the user has selected the code entity from the one of the plurality of auto-completion menus, to automatically complete entry of the selected code entity into the source code editor.

12. The system of claim 8, wherein the plurality of code entities comprise a plurality of attribute names.

13. The system of claim 8, wherein the computer program logic further comprises a parser that is programmed to cause the one or more processors to parse source code entered into the source code editor to generate a record of one or more code entities in the plurality of code entities.

14. The system of claim 8, wherein the computer program logic further comprises a document processor that is programmed to cause the one or more processors to process a document that includes code entities associated with a coding framework to generate a record of one or more code entities in the plurality of code entities.

15. The system of claim 14, wherein the document processor is programmed to cause the one or more processors to process an XML schema document that includes the code entities associated with the coding framework.

16. A computer program product comprising a computer readable storage device having computer program logic recorded thereon for enabling a processing unit to provide auto-completion functionality in a source code editor, the computer program logic comprising:

first computer program logic that, when executed by the processing unit, identifies a plurality of code entities that comprise all candidate code entities available from the source code editor for a single auto-completion operation for a single code entity based on data that a user has input via a user interface (UI) into the source code editor;

second computer program logic that, when executed by the processing unit, determines a number of menus in a plurality of auto-completion menus by which to present a total number of code entities in the plurality of code entities to the user via the UI for the single auto-completion operation, each menu in the plurality of auto-completion menus being configured to present a unique subset of the plurality of code entities at a given time, the number of menus being configured by the user;

third computer program logic that, when executed by the processing unit, presents subsequent to determining the number of menus a first auto-completion menu of the plurality of auto-completion menus that allows access to the plurality of code entities in the UI, the first auto-completion menu including an element that is a code entity representation that when activated by the user via a selection input causes a second menu of the plurality of auto-completion menus for the single auto-completion operation, each of the first and second menus including one or more of the candidate code entities for the single auto-completion operation for the single code entity.

17. The computer program product of claim 16, wherein the plurality of code entities includes a plurality of attribute names.

18. The computer program product of claim 16, wherein the third computer program logic comprises at least:

fourth computer program logic that, when executed by the processing unit, presents the first menu to the user wherein the element represents a first subset of the code entities; and fifth computer program logic that, when executed by the processing unit, presents a second menu to the user that includes at least one code entity in the first subset of the code entities in response to the user selecting the element that represents the first subset of the code entities from the first menu.

19. The computer program product of claim 18, further comprising:

sixth computer program logic that, when executed by the processing unit, determines that the user has selected a code entity from the second menu; and seventh computer program logic that, when executed by the processing unit, automatically completes input of the selected code entity into the source code editor.

20. The computer program product of claim 18, wherein the element that represents the first subset of the code entities comprises a first common set of initial characters.

* * * * *